(12) United States Patent
Huang

(10) Patent No.: US 7,431,393 B1
(45) Date of Patent: Oct. 7, 2008

(54) BICYCLE SADDLE MOUNT WITH LIGHT DEVICE

(76) Inventor: Chen Hua Huang, No. 91, Guenher Street, Beitun, Taichung 40643 (TW)

( * ) Notice: Subject to any disclaimer, the term of this patent is extended or adjusted under 35 U.S.C. 154(b) by 0 days.

(21) Appl. No.: 11/894,460

(22) Filed: Aug. 21, 2007

(51) Int. Cl.
*B62J 6/00* (2006.01)

(52) U.S. Cl. ............... 297/217.6; 297/195.1; 297/196; 362/473

(58) Field of Classification Search ............ 297/195.1, 297/196, 215, 217.6; 362/253, 431, 432, 362/473, 549
See application file for complete search history.

(56) References Cited

U.S. PATENT DOCUMENTS

| | | | | |
|---|---|---|---|---|
| 4,819,135 A | * | 4/1989 | Padilla et al. | 362/473 |
| 5,197,795 A | * | 3/1993 | Mudrovich | 362/473 |
| 5,308,140 A | * | 5/1994 | Yu | 297/195.1 |
| 5,397,161 A | * | 3/1995 | Huang | 297/195.1 |
| 5,457,612 A | * | 10/1995 | Carter | 362/473 |
| 5,618,052 A | * | 4/1997 | Rendall | 362/473 |
| 5,855,410 A | | 1/1999 | Lin | 297/215.15 |
| 5,911,473 A | * | 6/1999 | Hill | 297/195.1 |
| 5,971,477 A | * | 10/1999 | Bell et al. | 297/217.6 |
| 6,007,148 A | * | 12/1999 | Yu | 297/195.1 |
| 6,019,422 A | | 2/2000 | Taormino et al. | 297/195.1 |
| 6,260,918 B1 | | 7/2001 | Lee | 297/195.1 |
| 6,688,684 B2 | | 2/2004 | Huang | 297/195.1 |
| 6,830,363 B2 | * | 12/2004 | Pisula | 362/474 |

* cited by examiner

*Primary Examiner*—Peter R. Brown
(74) *Attorney, Agent, or Firm*—Charles E. Baxley

(57) ABSTRACT

A bicycle saddle mount includes a cushioning device disposed between a saddle member and a seat post and having a pair of frames each of which include a bent portion formed between the upper leg and the lower leg for forming an opening in each of the frames and for cushioning the saddle member, and two gaskets engaged in the openings of the frames for further cushioning the saddle member, a casing disposed between the gaskets, and a light device attached to the casing for generating an indicating or safety light and for allowing the bicycle saddle mount to be seen in a dark environment.

12 Claims, 4 Drawing Sheets

BICYCLE SADDLE MOUNT WITH LIGHT DEVICE

BACKGROUND OF THE INVENTION

1. Field of the Invention

The present invention relates to a bicycle saddle mount, and more particularly to a bicycle saddle mount including a shock absorbing or cushioning device for cushioning the bicycle saddle and including a light device for generating an indicating or warning light.

2. Description of the Prior Art

Typical bicycle saddle mounts comprise a seat or saddle member attached to and supported on a seat post with a support frame, and one or more resilient or cushioning devices disposed between the seat or saddle member and the support frame or the seat post for absorbing shocks and for preventing the shocks from being transmitted to the bicycle riders.

For example, U.S. Pat. No. 5,855,410 to Lin, U.S. Pat. No. 6,019,422 to Taormino et al., and U.S. Pat. No. 6,260,918 to Lee disclose three of the typical bicycle saddle mounts each also comprising one or more resilient or cushioning devices disposed between the seat or saddle member and the support frame or the seat post for cushioning the seat or saddle member.

However, the resilient or cushioning devices may only be used for absorbing shocks and for cushioning the seat or saddle member, but may not be used for attaching any light device due to the deformable or resilient characteristics of the resilient or cushioning devices.

U.S. Pat. No. 6,686,684 to Huang, the present applicant who has developed an improved cushioning device for disposing in a frame for cushioning the seat or saddle member and for absorbing shocks.

The present invention has arisen to mitigate and/or obviate the afore-described disadvantages of the conventional bicycle saddle mounts.

SUMMARY OF THE INVENTION

The primary objective of the present invention is to provide a bicycle saddle mount including a shock absorbing or cushioning device for cushioning the bicycle saddle and including a light device for generating an indicating or warning light.

In accordance with one aspect of the invention, there is provided a bicycle saddle mount comprising a cushioning device disposed between a saddle member and a seat post for cushioning the saddle member, the cushioning device including a pair of frames each having an upper leg attached to the saddle member, and a lower leg for attaching to the seat post, and the frames each including a bent portion formed between the upper leg and the lower leg for forming an opening in each of the bent portions of the frames, two gaskets engaged in the openings of the frames respectively for further cushioning the saddle member, a casing disposed between the gaskets, and a light device attached to the casing for generating an indicating light and for allowing the bicycle saddle mount to be seen in a dark environment.

The casing includes a chamber formed therein, the light device may be detachably received in the chamber of the casing. The gaskets each include a bore formed therein, and the casing includes two studs extended outwardly therefrom for engaging through the bores of the gaskets and for anchoring or securing the casing to the gaskets.

Two panels are further provided and engaged onto the gaskets respectively and each include a threaded passage formed therein for engaging with the studs respectively and for securing the gaskets between the panels and the casing. Two light members are further provided and attached to the panels respectively.

The fasteners of the panels are hollow and each include a passage formed therein, and the light members each include at least one prong engaged through the passages of the fasteners respectively.

Two hoods are further provided and detachably attached onto the panels respectively. The panels each include an outer thread formed thereon, and the hoods each include an inner thread formed therein for engaging with the outer threads of the panels and for detachably attaching or securing the hoods onto the panels respectively.

The gaskets each include a plurality of apertures formed therein, and the apertures of the gaskets are arranged around the studs of the casing. The frames each include two bent segments formed between the bent portions and the upper and the lower legs for forming the openings in the frames.

A box is further provided and attached to the casing. The casing includes a track formed therein, the box includes a latch engaged with the track of the casing for detachably attaching the box to the casing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
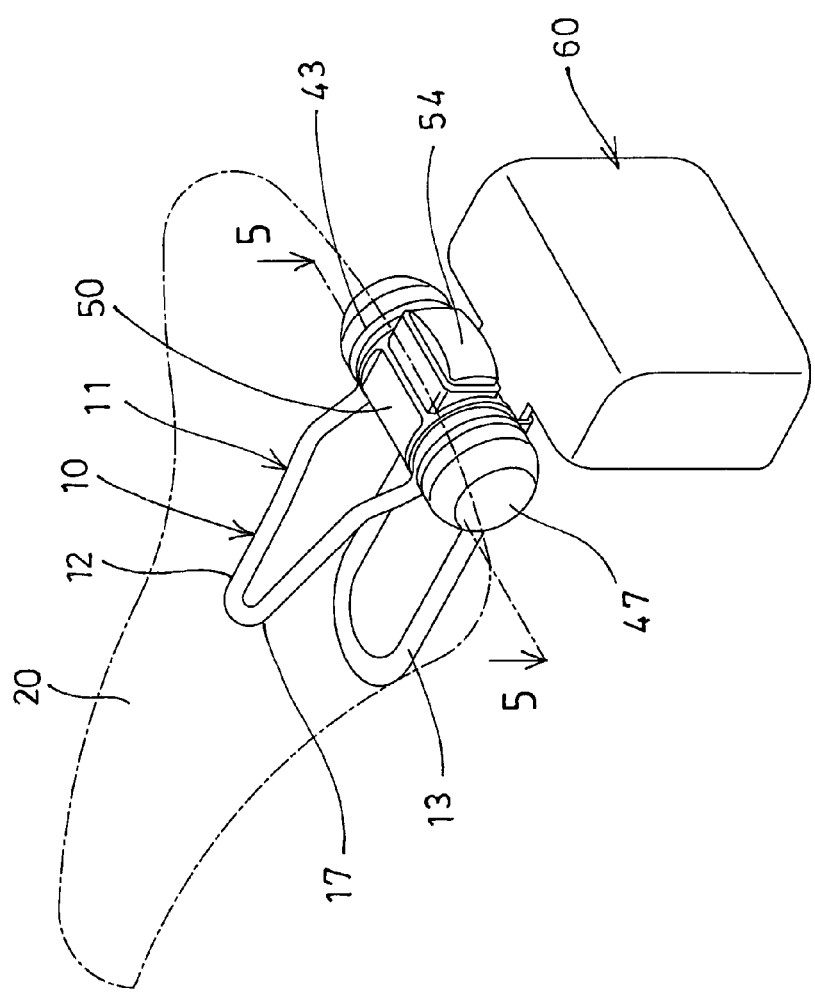
FIG. 1 is a perspective view of a bicycle saddle mount in accordance with the present invention.
Figure 2:
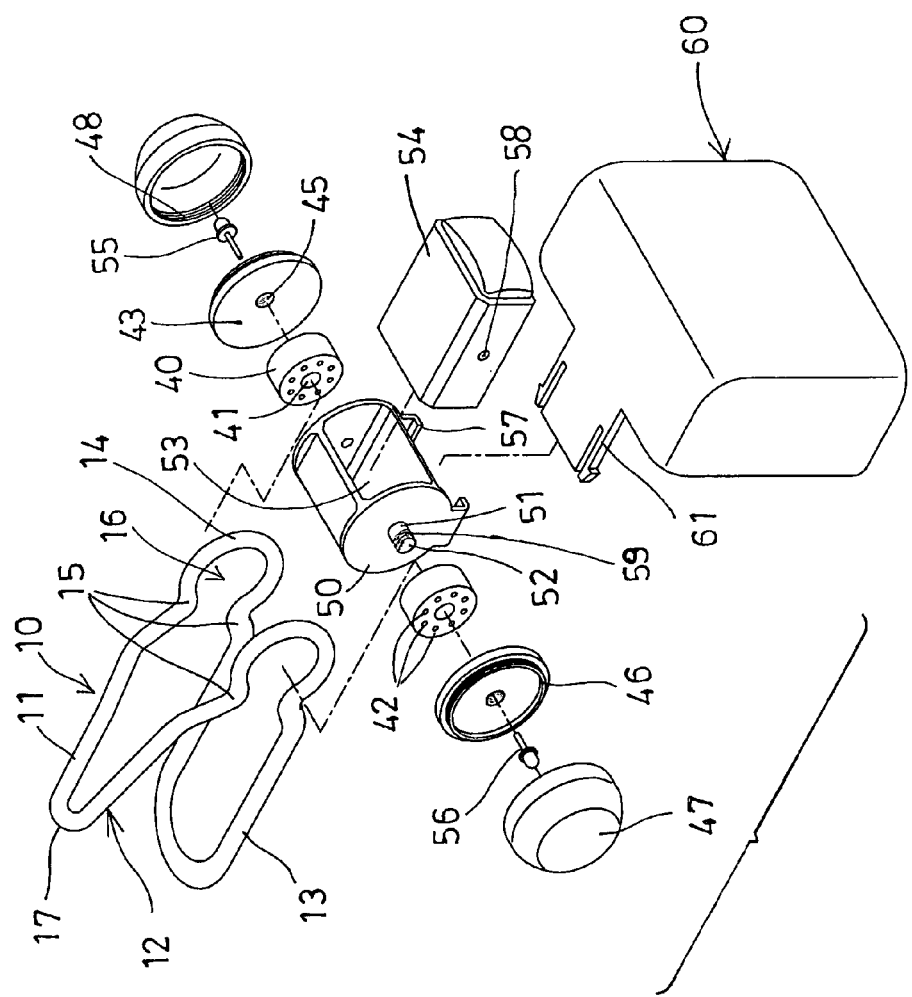
FIG. 2 is a partial exploded view of the bicycle saddle mount.
Figure 3:
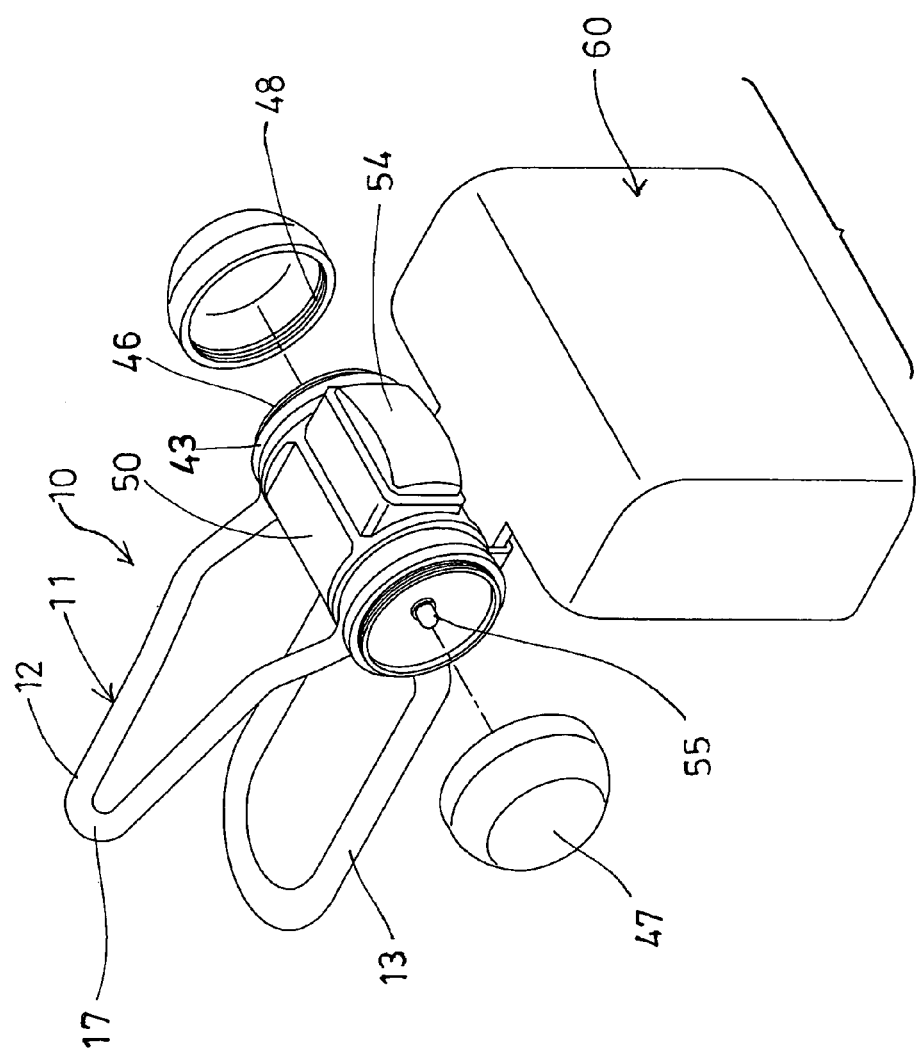
FIG. 3 is another partial exploded view of the bicycle saddle mount.
Figure 4:
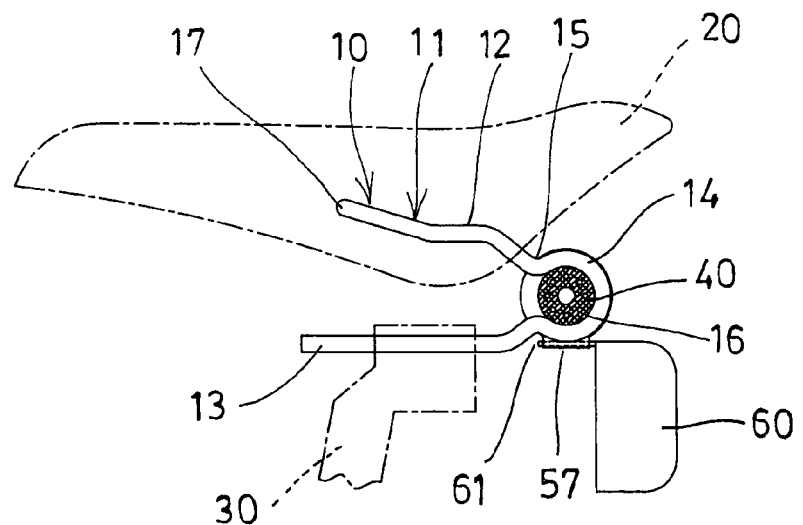
FIG. 4 is a side plan schematic view of the bicycle saddle mount illustrating the operation of the bicycle saddle mount.

Referring to the drawings, and initially to FIGS. 1-4, a bicycle saddle mount in accordance with the present invention comprises a cushioning device 10 to be secured between a saddle member 20 and a seat post 30 for cushioning the saddle member 20, and includes a pair of frames 11 that are substantially parallel to each other, the frames 11 each include an upper leg 12 attached or engaged with or secured to the saddle member 20, and a lower leg 13 attached or engaged with or secured to the seat post 30, and each include a bent portion 14 formed or provided between the upper leg 12 and the lower leg 13, and two bent segments 15 formed and provided between the bent portion 14 and the respective upper leg 12 and the lower leg 13, and for forming a circular opening 16 formed in the respective bent portion 14 of the frames 11 or in each of the frames 11 (FIGS. 2, 4).

The frames 11 may be formed as an integral-one-piece structure and may be formed or manufactured or bent from a longitudinal rod or wire. The front ends 17 of the frames 11 may be attached or engaged with or secured to the saddle member 20 with such as latches or fasteners (not shown), and the lower legs 13 of the frames 11 may also be attached or engaged with or secured to the seat post 30 with such as latches or fasteners (not shown) in the typical ways or methods. The attachment or the securing of the frames 11 of the cushioning device 10 to the saddle member 20 and the seat post 30 is not related to the present invention and will not be described in further details.

It is to be noted that the frames 11 of the cushioning device 10 are designed and arranged for allowing the upper legs 12 of the frames 11 to be easily and readily attached onto or secured to the saddle member 20 that is especially designed for attaching to the frame 11, and it is to be noted that the frames 11 of the cushioning device 10 are designed and arranged for allowing the lower legs 13 of the frames 11 to be easily and readily attached onto or secured to the seat post 30 of the typical cycles without changing or modifying the configuration of the seat post 30, and for allowing the frames 11 of the cushioning device 10 to form an excellent cushioning structure and for suitably cushioning the saddle member 20, and for absorbing shocks and for preventing the shocks from being transmitted to the bicycle riders. The above-described structure has been disclosed in U.S. Pat. No. 6,686,684 to Huang and will not be described in further details.

The cushioning device 10 further includes two pads or soft or resilient members or gaskets 40 engaged in the openings 16 of the frames 11 respectively for further suitably cushioning the frames 11 of the cushioning device 10 and the saddle member 20. The gaskets 40 each include a bore 41 formed therein, and a number of apertures 42 formed therein and formed or located or arranged around the bore 41 thereof for increasing the resilience of the gaskets 40. A barrel or casing 50 is disposed or engaged between the gaskets 40, and includes two studs 51 extended laterally or axially and outwardly from the two side portions of the casing 50 (FIG. 2) for engaging through the bores 41 of the gaskets 40, and for anchoring or positioning or retaining or securing the casing 50 to the gaskets 40.

The studs 51 each include an orifice 52 formed therein (FIG. 2), and each include an outer thread 59 formed thereon. The apertures 42 of the gaskets 40 are also arranged around the studs 51 of the casing 50. The casing 50 includes a chamber 53 formed therein for receiving a light device 54 therein which preferably faces rearwardly relative to the cushioning device 10 and the saddle member 20 for generating an indicating or warning or safety light and for allowing the bicycle or the bicycle riders to be clearly seen in the dark environment. Two washers of panels 43 are engaged onto the outer portions of gaskets 40 respectively and each include a threaded passage 45 formed therein for threading or engaging with the outer thread 59 of the studs 51 of the casing 50 respectively and for stably or solidly securing the gaskets 40 between the panels 43 and the casing 50, and for stably or solidly positioning or retaining the gaskets 40 in the openings 16 of the frames 11 respectively (FIG. 5).

The panels 43 each include an outer thread 46 formed thereon and facing outwardly away from the gaskets 40 and the casing 50, and two caps or hoods 47 each include an inner thread 48 formed therein for threading or engaging with the outer thread 46 of the panels 43 and for detachably attaching or securing the hoods 47 onto the panels 43 or onto the two side portions of the frames 11 or of the saddle member 20. Two further light devices or light members 55 are attached to the panels 43 or engaged in the orifices 52 of the studs 51 or engaged with the connectors 58 of the light device 54, or disposed in the hoods 47 respectively, and each include two prongs 56 engaged through the passages 45 of the panels 43 and the orifices 52 of the studs 51 respectively and for electrically coupling to the connectors 58 of the light device 54, in which the light device 54 and the light members 55 may be energized by such as batteries or electric generators (not shown) or the like.

The casing 50 may further include a rail or track 57 formed therein or formed in the bottom portion thereof (FIGS. 2, 5), and a box 60, such as a tool box 60 may further be provided and attached or secured to the casing 50 with an extension or latch 61 which may be engaged with the tracks 57 of the casing 50, and which may detachably attach or secure the box 60 onto the casing 50, the box 60 may be provided for receiving the tools or repair kits for the bicycle and/or for receiving the batteries or electric generators (not shown) or the like, and/or the control device (not shown) for controlling the light device 54 and/or the light members 55. For example, the light device 54 may be controlled or energized by the control device (not shown) when in the dark environment, and the light members 55 may be energized to signal the left turn or the right turn operations.

Figure 5:
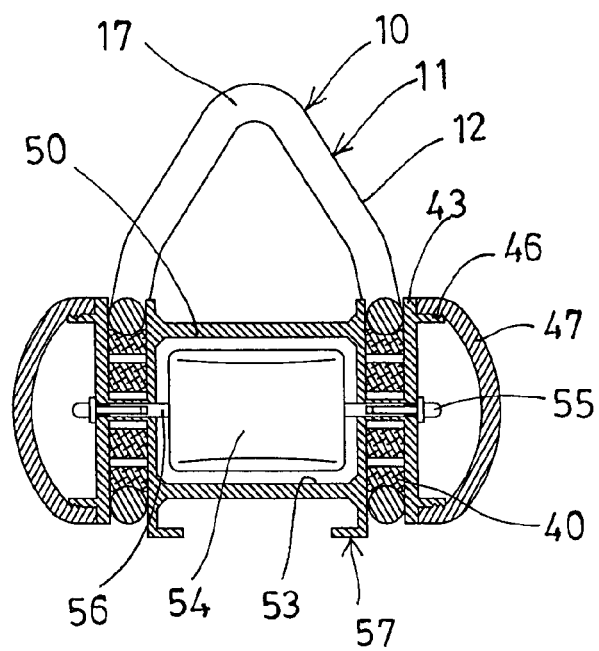
FIG. 5 is a cross sectional view of the bicycle saddle mount taken along lines 5-5 of FIG. 1.

In operation, as shown in FIGS. 1 and 4-5, the gaskets 40 may be selectively engaged into the openings 16 of the frames 11 respectively for increasing the cushioning effect of the frames 11. For example, the engagement of the gaskets 40 in the openings 16 of the frames 11 may increase the stiffness or the strength of the frames 11, and the light device 54 and/or the light members 55 may be energized to generate the indicating or warning or safety light for allowing the bicycle or the bicycle riders to be clearly seen in the dark environment. The light members 55 at the two side portions of the frames 11 or of the saddle member 20 may be energized to signal the left turn or the right turn operations, and the light device 54 and/or the light members 55 may be controlled by an actuating handle (not shown) that may be attached to the handlebar of the bicycle.

It is to be noted that the typical bicycle saddle mounts failed to provide two pads or soft or resilient members or gaskets 40 engaged in the openings 16 of the frames 11 of the cushioning device 10 respectively, and failed to simultaneously provide one or more light device 54 or light members 55 attached to the gaskets 40 or the casing 50 or the panels 43 for generating an indicating or warning or safety light.

Accordingly, the bicycle saddle mount in accordance with the present invention includes a shock absorbing or cushioning device for cushioning the bicycle saddle and including a light device for generating an indicating or warning light.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bicycle saddle mount comprising:
  a cushioning device disposed between a saddle member and a seat post for cushioning said saddle member,
  said cushioning device including a pair of frames each having an upper leg attached to said saddle member, and a lower leg for attaching to said seat post, and said frames each including a bent portion formed between said upper leg and said lower leg for forming an opening in each of said bent portions of said frames,
  two gaskets engaged in said openings of said frames respectively,
  a casing disposed between said gaskets, and
  a light device attached to said casing for generating an indicating light and for allowing said bicycle saddle mount to be seen in a dark environment.

2. The bicycle saddle mount as claimed in claim 1, wherein said casing includes a chamber formed therein, said light device is received in said chamber of said casing.

3. The bicycle saddle mount as claimed in claim 1, wherein said gaskets each include a bore formed therein, said casing includes two studs extended outwardly therefrom for engaging through said bores of said gaskets and for anchoring said casing to said gaskets.

4. The bicycle saddle mount as claimed in claim 3, wherein two panels are engaged onto said gaskets respectively and each include a threaded passage formed therein for engaging with said studs and for securing said gaskets between said panels and said casing.

5. The bicycle saddle mount as claimed in claim 4, wherein two light members are attached to said panels respectively.

6. The bicycle saddle mount as claimed in claim 5, wherein said panels each include a passage formed therein, and said light members each include at least one prong engaged through said passages of said panels respectively.

7. The bicycle saddle mount as claimed in claim 4, wherein two hoods are detachably attached onto said panels respectively.

8. The bicycle saddle mount as claimed in claim 7, wherein said panels each include an outer thread formed thereon, and said hoods each include an inner thread formed therein for engaging with said outer threads of said panels and for detachably attaching said hoods onto said panels respectively.

9. The bicycle saddle mount as claimed in claim 1, wherein said gaskets each include a plurality of apertures formed therein, and said apertures of said gaskets are arranged around said studs of said casing.

10. The bicycle saddle mount as claimed in claim 1, wherein said frames each include two bent segments formed between said bent portions and said upper and said lower legs for forming said openings in said frames.

11. The bicycle saddle mount as claimed in claim 1, wherein a box is attached to said casing.

12. The bicycle saddle mount as claimed in claim 11, wherein said casing includes a track formed therein, said box includes a latch engaged with said track of said casing for detachably attaching said box to said casing.

* * * * *